US010099521B2

(12) United States Patent
Yamaguchi

(10) Patent No.: US 10,099,521 B2
(45) Date of Patent: Oct. 16, 2018

(54) TIRE-STATE DETECTION DEVICE

(71) Applicant: BRIDGESTONE CORPORATION, Tokyo (JP)

(72) Inventor: Shigeru Yamaguchi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 113 days.

(21) Appl. No.: 15/120,593

(22) PCT Filed: Jan. 26, 2015

(86) PCT No.: PCT/JP2015/052004
§ 371 (c)(1),
(2) Date: Aug. 22, 2016

(87) PCT Pub. No.: WO2015/129360
PCT Pub. Date: Sep. 3, 2015

(65) Prior Publication Data
US 2017/0015149 A1    Jan. 19, 2017

(30) Foreign Application Priority Data
Feb. 25, 2014 (JP) .................................. 2014-033678

(51) Int. Cl.
*B60C 23/04* (2006.01)
*B60C 19/00* (2006.01)
(Continued)

(52) U.S. Cl.
CPC .......... *B60C 23/0474* (2013.01); *B60C 19/00* (2013.01); *B60C 23/0493* (2013.01); *B60C 23/18* (2013.01); *G01L 17/00* (2013.01)

(58) Field of Classification Search
CPC ............................ B60C 23/0491; G01L 17/00
See application file for complete search history.

(56) References Cited

U.S. PATENT DOCUMENTS 3,968,694 A    7/1976 Clark
8,671,766 B2 *  3/2014 Sterling .................. H01L 23/04
                                                        73/700
(Continued)

FOREIGN PATENT DOCUMENTS

CN    1860356 A    11/2006
JP    04-106439 A   4/1992
(Continued)

OTHER PUBLICATIONS

International Search Report for PCT/JP2015/052004 dated Jan. 26, 2015 [PCT/ISA/210].
(Continued)

*Primary Examiner* — Paul West
(74) *Attorney, Agent, or Firm* — Sughrue Mion, PLLC

(57) ABSTRACT

A tire-state detection device according to the present invention includes: an electronic component including a detection unit that detects a pressure of a tire; and a case that houses the electronic component. The case includes: a case main body that houses the electronic component and that has an open surface formed thereon; and a lid member that covers the open surface. The detection unit includes: a pressure sensor section having a diaphragm-type element; a sensor control section that controls the pressure sensor section; and a dome-shaped shield cover that covers the pressure sensor section and the sensor control section. An inside of the case main body having the open surface covered with the lid member is filled with a sealant, and the diaphragm-type element is made of a ceramic.

4 Claims, 7 Drawing Sheets

(51) Int. Cl.
*G01L 17/00* (2006.01)
*B60C 23/18* (2006.01)

(56) References Cited

U.S. PATENT DOCUMENTS

| | | |
|---|---|---|
| 2005/0028596 A1 | 2/2005 | Gall |
| 2005/0210993 A1 | 9/2005 | Toyoda et al. |
| 2005/0229710 A1* | 10/2005 | O'Dowd ............... G01L 9/0072 73/718 |
| 2012/0188695 A1 | 7/2012 | Yamaguchi |
| 2013/0229275 A1 | 9/2013 | Nakatani |

FOREIGN PATENT DOCUMENTS

| | | | |
|---|---|---|---|
| JP | 2001174357 A | 6/2001 |
| JP | 2001181052 A | 7/2001 |
| JP | 2005-265555 A | 9/2005 |
| JP | 2006-329883 A | 12/2006 |
| JP | 2009-288003 A | 12/2009 |
| JP | 2011-042261 A | 3/2011 |
| JP | 2012105062 A | 5/2012 |

OTHER PUBLICATIONS

Written Opinion for PCT/JP2015/052004 dated Jan. 26, 2015 [PCT/ISA/237].

Communication dated Apr. 19, 2017 issued from the State Intellectual Property Office of People's Republic of China in counterpart Application No. 201580010422X.

Search Report dated Dec. 5, 2017 from the State Intellectual Property Office of the P.R.C. in counterpart Chinese application No. 201580010422.X.

\* cited by examiner

TIRE-STATE DETECTION DEVICE

CROSS REFERENCE TO RELATED APPLICATIONS

This application is a National Stage of International Application No. PCT/JP2015/052004 filed Jan. 26, 2015, claiming priority based on Japanese Patent Application No. 2014-033678 filed Feb. 25, 2014, the contents of all of which are incorporated herein by reference in their entirety.

TECHNICAL FIELD

The present invention relates to a tire-state detection device including an electronic component including a detection unit that detects a tire state such as an inner pressure of a tire.

BACKGROUND ART

A structure in which a circuit board to which electronic components such as a detection unit and a wireless device are attached is housed in a case (box member) made of a synthetic resin has been widely employed for conventional tire-state detection devices that detect the inner pressure of a tire.

For such a tire-state detection device, a method has been known in which a circuit board housed in a case having an open surface formed thereon is sealed with a sealant such as an epoxy-based resin (for example, Patent Literature 1). The sealing of a circuit board housed in a case with a sealant makes it possible to prevent or reduce failure of the tire-state detection device due to vibration or moisture.

The tire-state detection device having the enhanced water resistance as described above has been widely introduced for tires mounted on dump trucks used in mines. This is because a liquid (hereinafter, referred to as a coolant) dedicated to reduction of the increase in temperature during travel and to corrosion inhibition is injected into such a tire, and hence the tire-state detection device is required to have water resistance.

CITATION LIST

Patent Literature

Patent Literature 1: Japanese Patent Application Publication No. 2006-329883 (Page 4, FIG. 1)

SUMMARY OF INVENTION

Technical Problem

However, the above-described conventional tire-state detection device has the following problem.

Under an environment inside a tire in which water of a coolant or the like has been injected, the tire-state detection device falls into a completely immersed state, or falls into a state where the surface of the sealant on the open surface side is completely covered with water vapor saturated inside the tire, when the position at which the tire-state detection device is placed or the amount of water of the coolant or the like satisfies a certain condition. Especially, since the inside of the above-described tire is placed in a high-temperature and high-pressure situation, water may permeate through the inside of the sealant in such a state. One reason for this is that the sealant is made of a polymer material.

In such a case, the sealant is more likely to degrade. For this reason, the degradation of the sealant may cause breakage of a bonding interface between the sealant and the case. Then, water of the coolant or the like enters the electronic component, causing failure of the electronic component. Consequently, there arises a problem in that tire states such as the inner pressure and the temperature of the tire cannot be detected.

In addition, in conventional tire state detection devices, a semiconductor element has been generally employed as a sensor element in a detection unit that detects the inner pressure of a tire. However, the detection unit employing a semiconductor element used in conventional detection devices is not guaranteed to have a sufficient reliability for use under a special environment as described above. For this reason, although the occurrence of failure is unavoidable to some degree, some countermeasure has been awaited to guarantee the reliability to some degree. In addition, the semiconductor element used in conventional detection devices belongs to a special group among common semiconductor elements, and hence is high in cost.

In this respect, an object of the present invention is to provide a tire-state detection device capable of surely detecting an inner pressure of a tire by preventing failure, while reducing the cost of the products.

Solution to Problem

To solve the above-described problems, the present invention has the following first feature. A tire-state detection device (tire-state detection device 100) includes: an electronic component (electron component 200) including a detection unit (detection unit 210) that detects a pressure of a tire; and a case (case 300) that houses the electronic component. The case includes: a box member (case main body 310) that houses the electronic component and that has an open surface (open surface 310A) formed thereon, and a lid member (lid member 320) that covers the open surface. The detection unit includes: a pressure sensor section (pressure sensor section 211) including a diaphragm-type element (diaphragm-type element 2111); a sensor control section (sensor control section 212) that controls the pressure sensor section; and a dome-shaped cover member (shield cover 215) that covers the pressure sensor section and the sensor control section. The inside of the box member having the open surface covered with the lid member is filled with a sealant (sealant 370), and the diaphragm-type element is made of a ceramic.

According to this feature, the inside of the box member having the open surface covered with the lid member is filled with the sealant. Accordingly, the sealant is not directly immersed in water, even when the tire-state detection device falls into a completely immersed state under an environment inside a tire in which water of a coolant or the like has been injected. For this reason, the degradation of the sealant becomes less likely to proceed. Consequently, it is possible to prevent the deformation of the sealant, and to surely prevent the breakage of the bonding interface between the sealant and the case. Accordingly, the inner pressure of a tire can be surely detected, while preventing failure of the electronic component.

In addition, the diaphragm-type element is made of a ceramic. According to this configuration, the diaphragm-type element has a simple structure in which plate-shaped ceramic sheets are stacked on each other, and hence a large amount of elements can be manufactured at once by using a manufacturing die. For this reason, the manufacturing cost can be reduced in comparison with the case where the diaphragm-type element is made of a semiconductor as in a conventional technique. This makes it possible to reduce the cost of products of the tire-state detection device.

As described above, this feature makes it possible to provide a tire-state detection device capable of surely detecting an inner pressure of a tire by preventing failure, while reducing the cost of the products.

A second feature of the present invention is according to the above-described feature of the present invention, and the gist of the second feature is that the detection unit includes an introduction pipe (introduction pipe 213) that connects a pressure reception surface (pressure reception surface 2111A) of the diaphragm-type element to an outside of the case, a pipe insertion hole (pipe insertion hole 216) through which the introduction pipe is inserted is formed in the cover member, the introduction pipe is formed in a cylindrical shape, the pressure reception surface of the diaphragm-type element is formed in a circular shape, and an inner diameter (inner diameter R1) of the introduction pipe is equal to or larger than a diameter (diameter R2) of the pressure reception surface of the diaphragm-type element.

A third feature of the present invention is according to the above-described feature of the present invention, and the gist of the third feature is that the inner diameter of the introduction pipe is equal to the diameter of the pressure reception surface of the diaphragm-type element.

A fourth feature of the present invention is according to the above-described feature of the present invention, and the gist of the fourth feature is that an external pipe insertion hole (external pipe insertion hole 312) through which the introduction pipe is inserted is formed in the box member, a front end portion (front end portion 213A) of the introduction pipe is located inside the external pipe insertion hole, an external cap (external cap 380) that covers the external pipe insertion hole is provided outside the external pipe insertion hole, and one or a plurality of ventilation holes (ventilation holes 343) are formed in the external cap.

A fifth feature of the present invention is according to the above-described feature of the present invention, and the gist of the fifth feature is that the pressure sensor section and the sensor control section in the detection unit are separate sections.

DESCRIPTION OF EMBODIMENTS

Next, embodiments of a tire-state detection device according to the present invention are described with reference to the drawings. Specifically, description is given of (1) Configuration of Detection Device Fixation System, (2) Details of Configuration of Tire-State Detection Device, (3) Method for Charging Sealant, (4) Details of Configuration of Detection Unit, (5) Operations and Effects, and (6) Other Embodiments.

Note that, in the following description of the drawings, the same or similar elements and portions are denoted by the same or similar signs. It should be noted that the drawings are schematic, and the ratios of dimensions and the like are different from actual ones.

Therefore, specific dimensions and the like should be determined considering the following description. Moreover, as a matter of course, the drawings include portions having different dimensional relationships and ratios from each other.

(1) Configuration of Detection Device Fixation System

Figure 1:
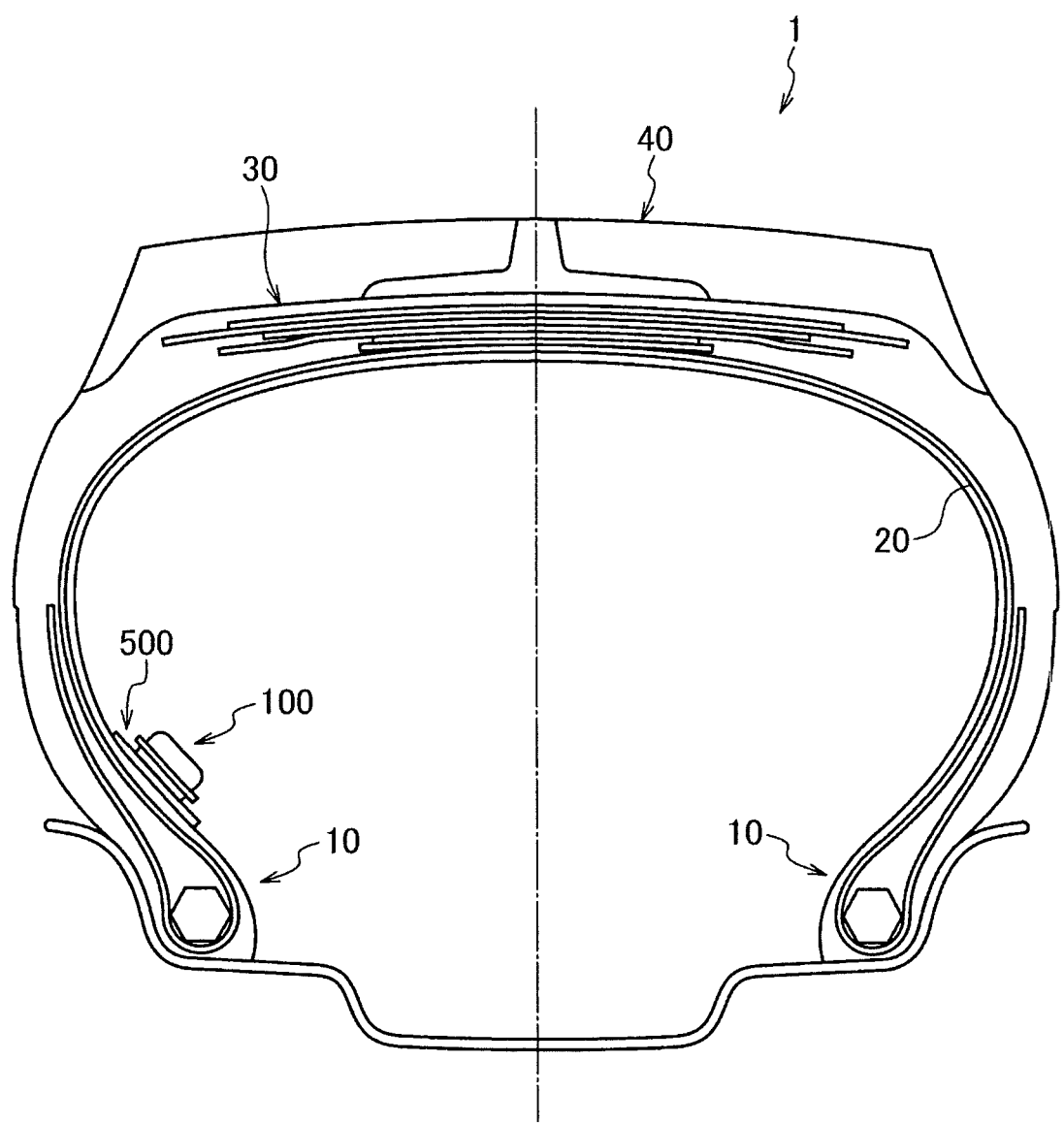
FIG. 1 is a cross-sectional view, taken in a tread width direction, showing a pneumatic tire on which a tire-state detection device according to an embodiment of the present invention is mounted.
Figure 2:
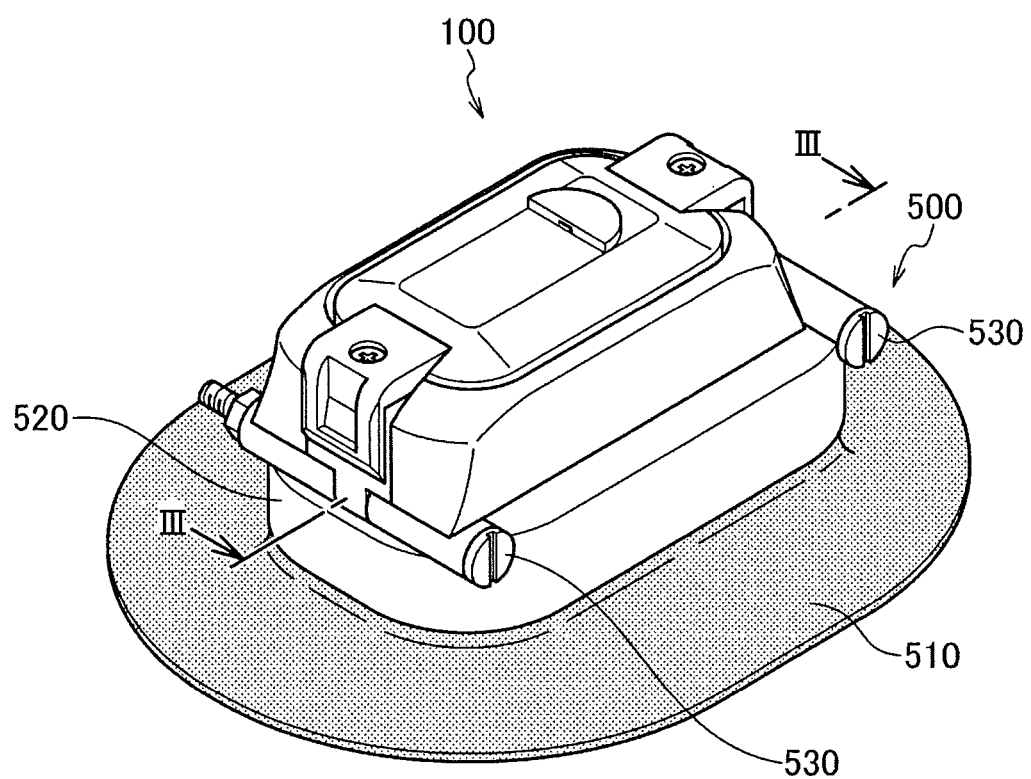
FIG. 2 is a perspective view showing a detection device fixation system according to this embodiment.

First, a configuration of a detection device fixation system 500 with which a tire-state detection device 100 according to an embodiment of the present invention is attached to a pneumatic tire 1 is described with reference to the drawings. FIG. 1 is a cross-sectional view, taken in a tread width direction, showing the pneumatic tire 1 on which the tire-state detection device 100 according to this embodiment is mounted. FIG. 2 is a perspective view showing the detection device fixation system 500 according to this embodiment.

The tire-state detection device 100 shown in FIG. 1 detects tire states such as an inner pressure and a temperature of the pneumatic tire 1. The tire-state detection device 100 is attached to the pneumatic tire 1. Note that, in addition to the inner pressure and the temperature of the pneumatic tire 1, the tire states may include the tire wear state, the trade name, the date of manufacturing, the serial number, and the lot number of the tire, and the like.

In this embodiment, the pneumatic tire 1 is mainly a tire mounted on a dump truck used in a mine. Water of a coolant or the like has been injected into the pneumatic tire 1. For this reason, the inside of the pneumatic tire 1 is always placed in a situation of high temperature and high pressure because of the gas with a high humidity and a high pressure. When the pneumatic tire 1 rotates, water of a coolant or the like is dispersed inside the pneumatic tire 1. In addition, when the coolant in the tire is gasified to water vapor, a state is created where the space inside the tire is always filled with saturated water vapor.

The pneumatic tire 1 includes: a bead portion 10 in contact with a rim (unillustrated); a carcass layer 20 forming a skeleton of the pneumatic tire 1; multiple belt layers 30 disposed outside the carcass layer 20 in a tire radial direction; and a tread portion 40 disposed outside the belt layers 30 in the tire radial direction to be in contact with a road surface. Note that the pneumatic tire 1 may be charged with an inert gas such as nitrogen gas instead of air.

The above-described tire-state detection device 100 is attached to an inner side surface 50 located on an inner peripheral surface of the carcass layer 20 by the detection device fixation system 500. Specifically, the tire-state detection device 100 is attached to an inner liner (a highly gas-tight rubber layer laminated on an inner surface of the pneumatic tire 1) inside the bead portion 10 in the tread width direction. The detection device fixation system 500 includes a seat portion 510 and a fixation portion 520, as shown in FIG. 2.

The seat portion 510 fixes the tire-state detection device 100 to the inner side surface 50 of the pneumatic tire 1 by the fixation portion 520. The seat portion 510 is formed of an elastic material. The seat portion 510 is particularly preferably formed of the same elastic material as that of the inner side surface 50 of the pneumatic tire 1.

The fixation portion 520 fixes the tire-state detection device 100 and the seat portion 510 to each other by bolts 530 (fastening members) or the like. In addition, the fixation portion 520 engages with a projection (unillustrated) formed in the seat portion 510. Consequently, the tire-state detection device 100 is fixed to the inner side surface 50 of the pneumatic tire 1.

(2) Details of Configuration of Tire-State Detection Device

Figure 3:
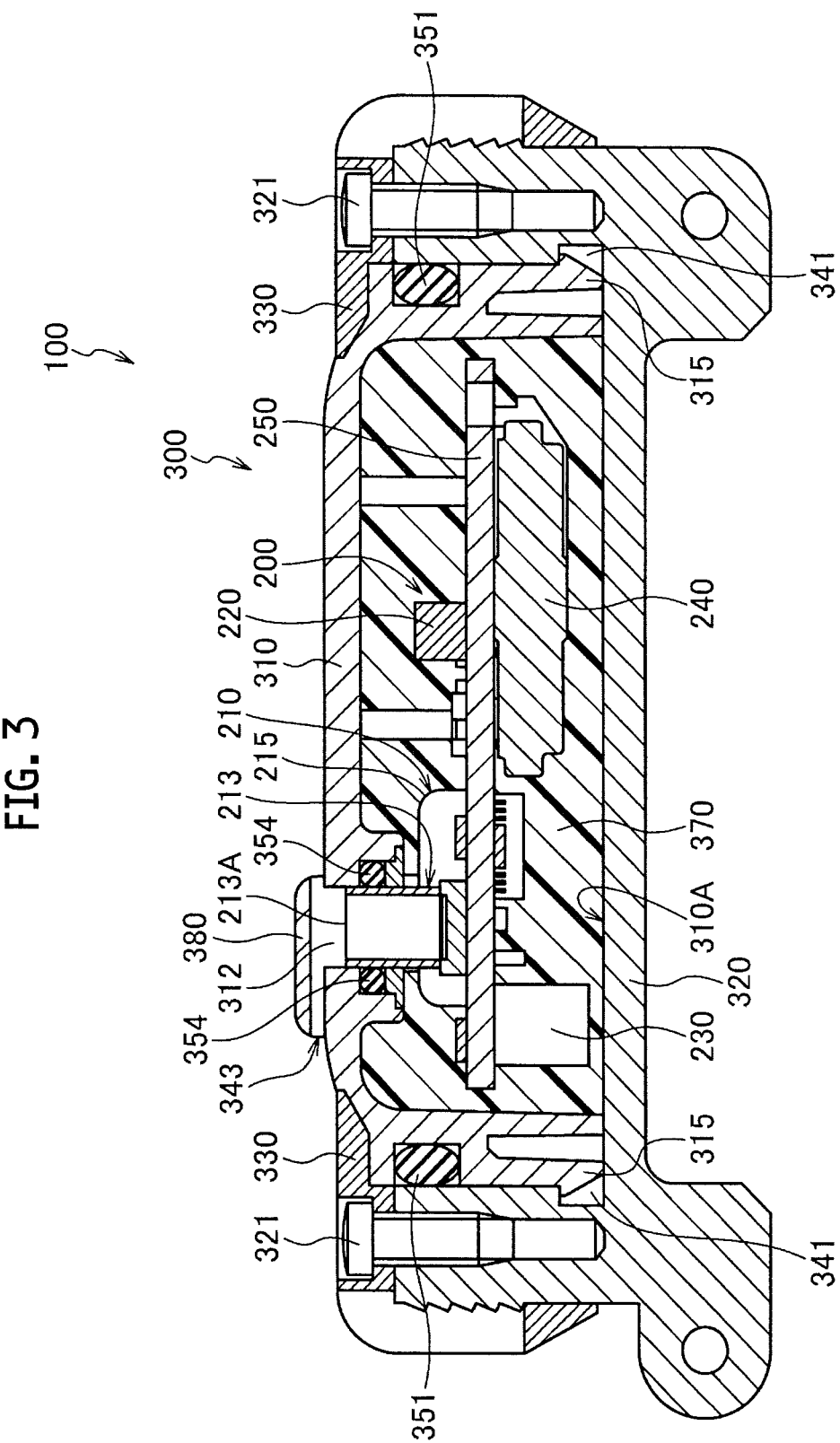
FIG. 3 is a cross-sectional view (a cross-sectional view taken along III-III in FIG. 2) showing part of the tire-state detection device according to this embodiment.

Next, details of configuration of the tire-state detection device 100 according to this embodiment are described with reference to the drawings. FIG. 3 is a cross-sectional view (a cross-sectional view taken along III-III in FIG. 2) showing part of the tire-state detection device 100 according to this embodiment.

As shown in FIG. 3, the tire-state detection device 100 includes an electronic component 200 and a case 300 housing the electronic component 200. As shown in FIG. 3, part of the inside of the case 300 in which the electronic component 200 is housed is filled with a sealant 370 (for example, an epoxy-based resin) which uses a polymer resin resistant to deformation and degradation even under a special environment such as high temperature, high pressure, or high humidity.

The electronic component 200 mainly includes a detection unit 210, an antenna 220, a battery 230, and an electronic circuit portion 240. Note that although other peripheral devices are also provided to the electronic component 200, detailed descriptions thereof are omitted.

The detection unit 210 detects a tire state such as the inner pressure of the pneumatic tire 1. The detection unit 210 may detect tire states also including the temperature of the pneumatic tire 1. Details of the detection unit are described later.

The antenna 220 exchanges radio signals. The battery 230 supplies energy (electric power) to the detection unit 210 and the like. The electronic circuit portion 240 includes: a microcomputer that controls a circuit board 250; a high-frequency modulation integrated circuit that modulates a signal outputted from the microcomputer to a high-frequency signal; a low-frequency demodulation integrated circuit that demodulates a low-frequency signal inputted to the antenna 220; and the like. Note that an enclosure of the electronic circuit portion 240 is formed of the same material as that of a component constituting the electronic circuit portion 240, and is, for example, formed of a metal, a resin, a ceramic, glass epoxy, or the like.

The detection unit 210, the antenna 220, the battery 230, and the electronic circuit portion 240 are provided on the circuit board 250. On the circuit board 250, a circuit pattern is formed which electrically connects constituents of the electronic component 200 to one another. Note that components other than the detection unit 210, the antenna 220, the battery 230, and the electronic circuit portion 240 may be provided on the circuit board 250.

The case 300 is formed of, for example, a non-metal organic material (for example, a resin) or the like. The case 300 includes a case main body 310 (box member), a lid member 320, and a fixation hook 330. The case main body 310 houses the electronic component 200, and an open surface 310A is formed on the case main body 310.

A locking raised portion 315 that locks the lid member 320 is formed on an outer surface of an edge portion forming the open surface 310A of the case main body 310 (see FIG. 3). The locking raised portion 315 is configured to be locked with a locking recessed portion 341 of the lid member 320 described later.

The case main body 310 is in contact with the lid member 320 with an O-ring 351 (elastic member) provided along an edge portion of the case main body 310. The O-ring 351 is formed of a rubber having a circular cross section or the like. Note that the inside of the case main body 310 having the open surface 310A covered with the lid member 320, i.e., the entire region of an inner space in which the electronic component 200 is disposed is filled and sealed with the above-described sealant 370.

The lid member 320 covers the entirety of the open surface 310A of the case main body 310. The lid member 320 is preferably attached to the case main body 310 in a state of being in surface contact with the surface of the sealant 370. The locking recessed portion 341, which locks the case main body 310, is formed on an inner surface of the lid member 320 (see FIG. 3). The locking recessed portion 341 is configured to lock the locking raised portion 315 of the case main body 310.

After the lid member 320 is attached to the case main body 310, the fixation hook 330 is fixed to the lid member 320 by bolts 321 (fastening members). A portion of the fixation hook 330 locks a portion of the case main body 310. As a result, the fixation hook 330 fixes the case main body 310 and the lid member 320 to each other.

An external pipe insertion hole 312 is formed in the case main body 310. An introduction pipe 213 described later is inserted through the external pipe insertion hole 312. A front end portion 213A of the introduction pipe 213 is located inside the external pipe insertion hole 312. An external cap 380 that covers the external pipe insertion hole 312 is provided outside the external pipe insertion hole 312.

An O-ring 354 is provided to a periphery of the external pipe insertion hole 312. Note that the O-ring 354 (elastic member) is formed of a rubber having a circular cross section or the like.

In the external cap 380, one or multiple ventilation holes 343 are formed. Each ventilation hole 343 connects the introduction pipe 213 and the outside of the case 300 (the case main body 310) to each other. The ventilation hole 343 is preferably smaller than the diameter of the introduction pipe 213. Note that the front end portion of the above-described introduction pipe 213 communicates with the external pipe insertion hole 312, and is located inside the external pipe insertion hole 312.

(3) Method for Charging Sealant

Next, a method for partially charging the sealant 370 into the case 300 in which the electronic component 200 is housed is described.

Firstly, the electronic component 200 is attached to the case main body 310 with the open surface 310A of the case main body 310 being directed upward (in a state where the case 300 in FIG. 3 is inverted).

Secondly, the sealant 370 is charged through the open surface 310A, with the open surface 310A of the case main body 310 being directed upward. Here, it is preferable to charge the sealant 370 up to the open surface 310A, so that the electronic component 200 can be surely filled with the sealant 370.

Thirdly, the lid member 320 is mounted on the case main body 310. Specifically, the lid member 320 is mounted in such a manner that the locking raised portion 315 of the case main body 310 can be locked by the locking recessed portion 341 of the lid member 320.

Fourthly, the fixation hook 330 is attached to the lid member 320. Specifically, the fixation hook 330 is mounted to fix the case main body 310 and the lid member 320 to each other, and the fixation hook 330 is attached to the lid member 320 by the bolts 321.

(4) Details of Configuration of Detection Unit

Figure 4:
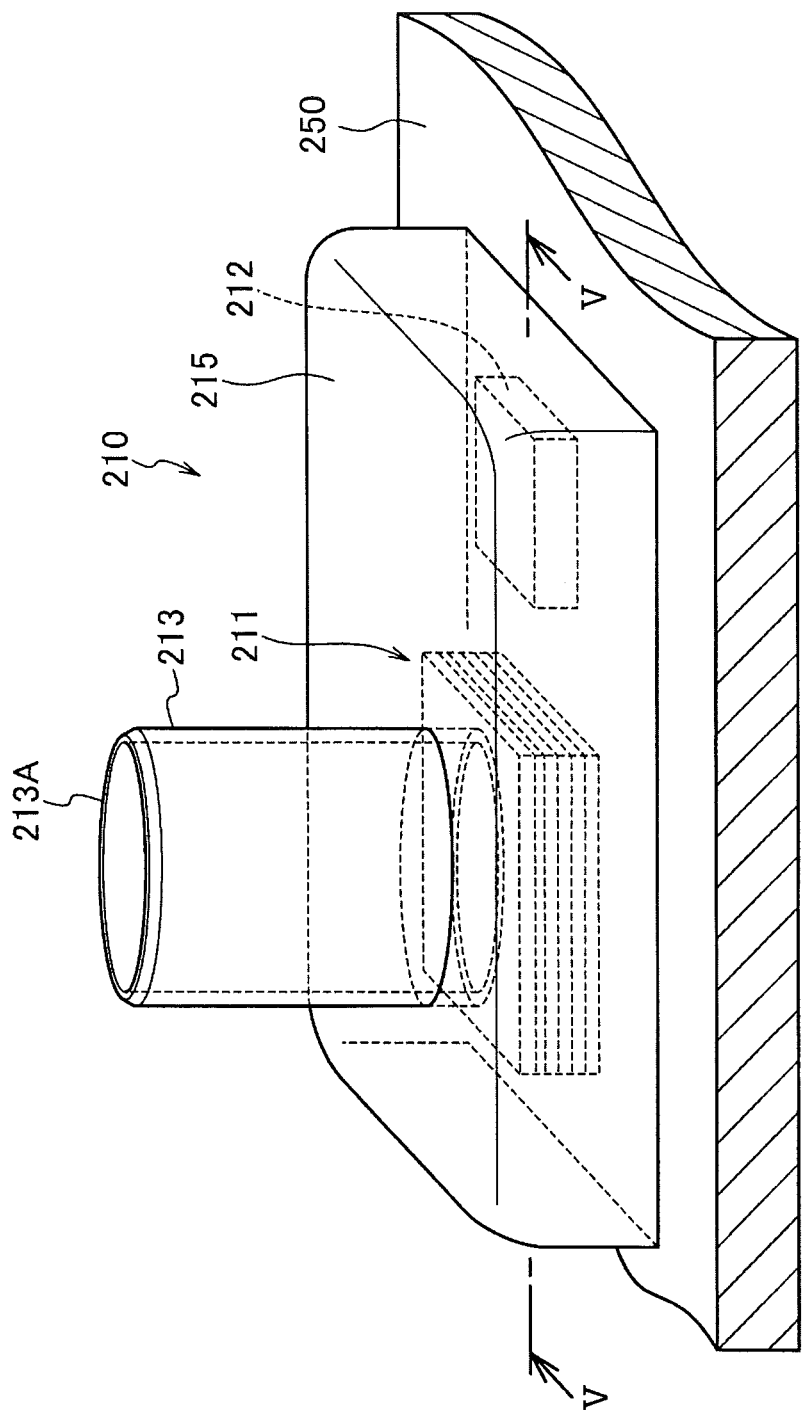
FIG. 4 is a perspective view of a detection unit according to this embodiment.
Figure 5:
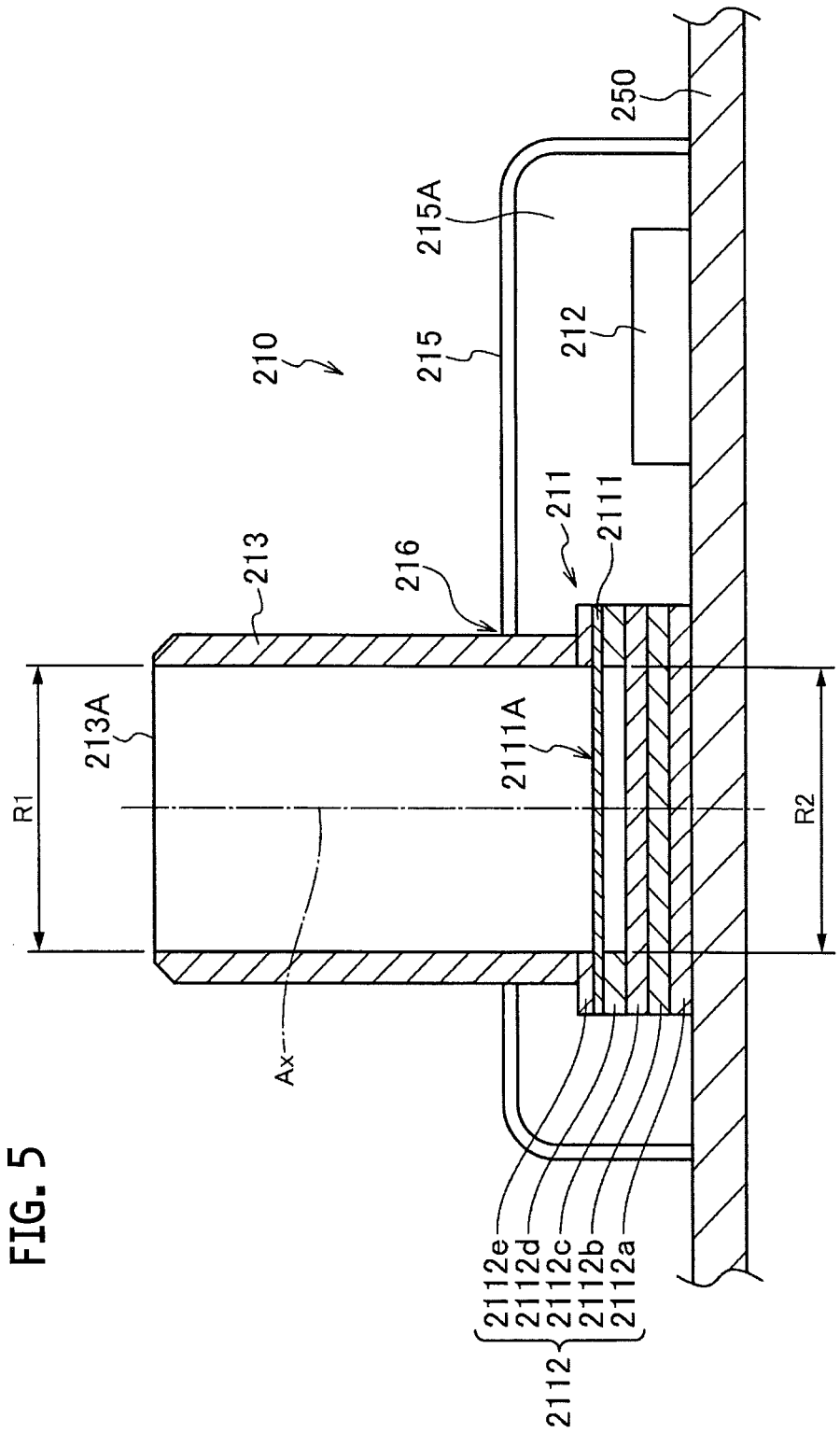
FIG. 5 is a cross-sectional view (a cross-sectional view taken along V-V in FIG. 4) of the detection unit according to this embodiment.

Next, details of configuration of the detection unit 210 according to this embodiment are described with reference to the drawings. FIG. 4 is a perspective view of the detection unit 210 according to this embodiment. FIG. 5 is a cross-sectional view (a cross-sectional view taken along V-V in FIG. 4) of the detection unit 210 according to this embodiment.

The detection unit 210 includes: a pressure sensor section 211; a sensor control section 212 that controls the pressure sensor section 211; a dome-shaped shield cover 215 (cover member); and the introduction pipe 213.

In this embodiment, the pressure sensor section 211 and the sensor control section 212 in the detection unit 210 are separated sections. Specifically, the pressure sensor section 211 and the sensor control section 212 are formed as different components, and are each connected by a cable (unillustrated).

The pressure sensor section 211 includes a diaphragm-type element 2111. Specifically, the pressure sensor section 211 includes the diaphragm-type element 2111 and multiple diaphragm substrates 2112.

The pressure sensor section 211 according to this embodiment is configured to measure a pressure by a capacitive method. Accordingly, the diaphragm substrates 2112 are provided with measuring electrodes (unillustrated) and the like, and the diaphragm-type element 2111 is provided with a moving electrode (unillustrated) and the like. However, detailed descriptions thereof are omitted in this embodiment.

In this embodiment, the diaphragm-type element 2111 is made of a ceramic. In other words, the diaphragm-type element 2111 is made of a ceramic plate. In addition, a pressure reception surface 2111A of the diaphragm-type element 2111 is formed in a circular shape. Note that, for example, the shape of the diaphragm-type element 2111 may be formed into a rectangular plate shape, and the pressure reception surface 2111A of the diaphragm-type element 2111 may be formed in a circular shape. In addition, a protective film or the like may be formed on the pressure reception surface 2111A of the diaphragm-type element 2111.

The multiple diaphragm substrates 2112 are arranged with the diaphragm-type element 2111 interposed therebetween. Note that five diaphragm substrates 2112a to 2112e are shown as an example of the multiple diaphragm substrates 2112 in FIG. 3; however, the number of the diaphragm substrates 2112 is not limited thereto.

The sensor control section 212 controls the pressure sensor section 211. The sensor control section 212 can convert a signal indicating a pressure value detected by the pressure sensor section 211 and output the converted signal to the electronic circuit portion 240.

The introduction pipe 213 connects the detection unit 210 and the case 300 to each other. The introduction pipe 213 is preferably made of a relatively corrosion resistant metal such as stainless steel. Moreover, a material having a coefficient of thermal expansion close to that of a ceramic is preferable. The introduction pipe 213 may be made of a metal such as brass. The introduction pipe 213 preferably has a thickness of 0.2 to 0.5 mm.

If the thickness of the introduction pipe 213 is less than 0.2 mm, the introduction pipe 213 is influenced by thermal expansion stress of a surrounding material. Meanwhile, if the thickness of the introduction pipe 213 is more than 0.5 mm, the thermal expansion of the pipe itself exerts an influence on the ceramic forming the diaphragm-type element 2111. For these reasons, the thickness of the introduction pipe 213 is preferably 0.2 to 0.5 mm.

In this embodiment, the introduction pipe 213 is formed in a cylindrical shape. The introduction pipe 213 connects the pressure reception surface 2111A of the diaphragm-type element 2111 and the outside of the case 300 to each other. Specifically, the pressure reception surface 2111A of the diaphragm-type element 2111 communicates with the outside of the case 300 through the ventilation holes 343 provided in the external cap 380 and the inside of the introduction pipe 213. For this reason, the same pressure as the pressure of the outside of the case 300 is applied to the pressure reception surface 2111A of the diaphragm-type element 2111.

The introduction pipe 213 is arranged such that a central axis Ax of the introduction pipe 213 can substantially coincide with a vertical direction perpendicular to a center of the pressure reception surface 2111A of the diaphragm-type element 2111. The introduction pipe 213 is preferably arranged such that the central axis Ax of the introduction pipe 213 can pass through the center of the pressure reception surface 2111A of the diaphragm-type element 2111.

In this embodiment, an inner diameter R1 of the introduction pipe 213 (a diameter of the inside of the introduction pipe 213) is equal to or larger than a diameter R2 of the pressure reception surface 2111A of the diaphragm-type element 2111. No specific requirement for the size is present, but the size may be set according to a requirement regarding the cost, the mechanical layout, or the like. Note that the inner diameter R1 of the introduction pipe 213 is preferably equal to the diameter R2 of the pressure reception surface 2111A of the diaphragm-type element 2111.

The shield cover 215 is formed in a dome shape covering the pressure sensor section 211 and the sensor control section 212. An edge portion of the shield cover 215 is fixed to the circuit board 250 in a close contact state. In the shield cover 215, a pipe insertion hole 216 is formed through which the introduction pipe 213 is inserted. An inner surface of the pipe insertion hole 216 of the shield cover 215 is in close contact with an outer peripheral surface of the introduction pipe 213. This prevents the sealant 370 from entering an inner portion 215A of the shield cover 215. It is particularly preferable that the shield cover 215 and the introduction pipe 213 be formed integrally with each other. In addition, in the inner portion 215A of the shield cover 215, a closed space is formed under an environment of the standard atmosphere (1 atm).

Here, since the pressure sensor section 211 is configured to measure the pressure by the capacitive method, a closed space under an environment of the standard atmosphere (1 atm) is preferable from the viewpoint that a stable pressure value is measured by the pressure sensor section 211. Under a condition that the pressure sensor section 211 can measure a stable pressure value, a configuration may be employed in which a sealant is sealed in the inner portion 215A of the shield cover 215.

(5) Operations and Effects

In the embodiment described above, the inside of the case main body 310 having the open surface 310A covered with the lid member 320 is filled with the sealant 370. According to this, the sealant 370 is not directly immersed in water even in a state where the tire-state detection device 100 is completely immersed under an environment of the inside of the pneumatic tire 1 into which water of a coolant or the like has been injected. Accordingly, degradation of the sealant 370 becomes less likely to proceed. Consequently, deformation of the sealant 370 can be prevented, and it is possible to surely prevent the breakage of a bonding interface between the sealant 370 and the case. Accordingly, while preventing failure of the electronic component 200, tire states such as the inner pressure and the temperature of the pneumatic tire 1 can be surely detected.

In this embodiment, the diaphragm-type element 2111 is made of a ceramic. This configuration eliminates the need for various countermeasures such as a countermeasure for strict protection against dust during manufacturing, in contrast to the case where the diaphragm-type element is made of a semiconductor as in a conventional technique. For this reason, the manufacturing cost can be reduced in comparison with the case where the diaphragm-type element is made of a semiconductor as in a conventional technique. This makes it possible to reduce the cost of products of the tire-state detection device 100.

Moreover, since the diaphragm-type element 2111 has a simple structure in which plate-shaped ceramic sheets are stacked on each other, a large amount of elements can be manufactured at once by using a manufacturing die, so that the manufacturing cost can be reduced.

As described above, the tire-state detection device 100 according to this embodiment makes it possible to surely detect the inner pressure of a tire by preventing failure, while reducing the cost of the products.

In addition, the introduction pipe 213 is formed in a cylindrical shape. The introduction pipe 213 connects the pressure reception surface 2111A of the diaphragm-type element 2111 and the outside of the case 300 to each other. The pressure reception surface 2111A of the diaphragm-type element 2111 is formed in a circular shape. The inner diameter R1 of the introduction pipe 213 is equal to or larger than the diameter R2 of the pressure reception surface 2111A of the diaphragm-type element 2111.

Figure 7:
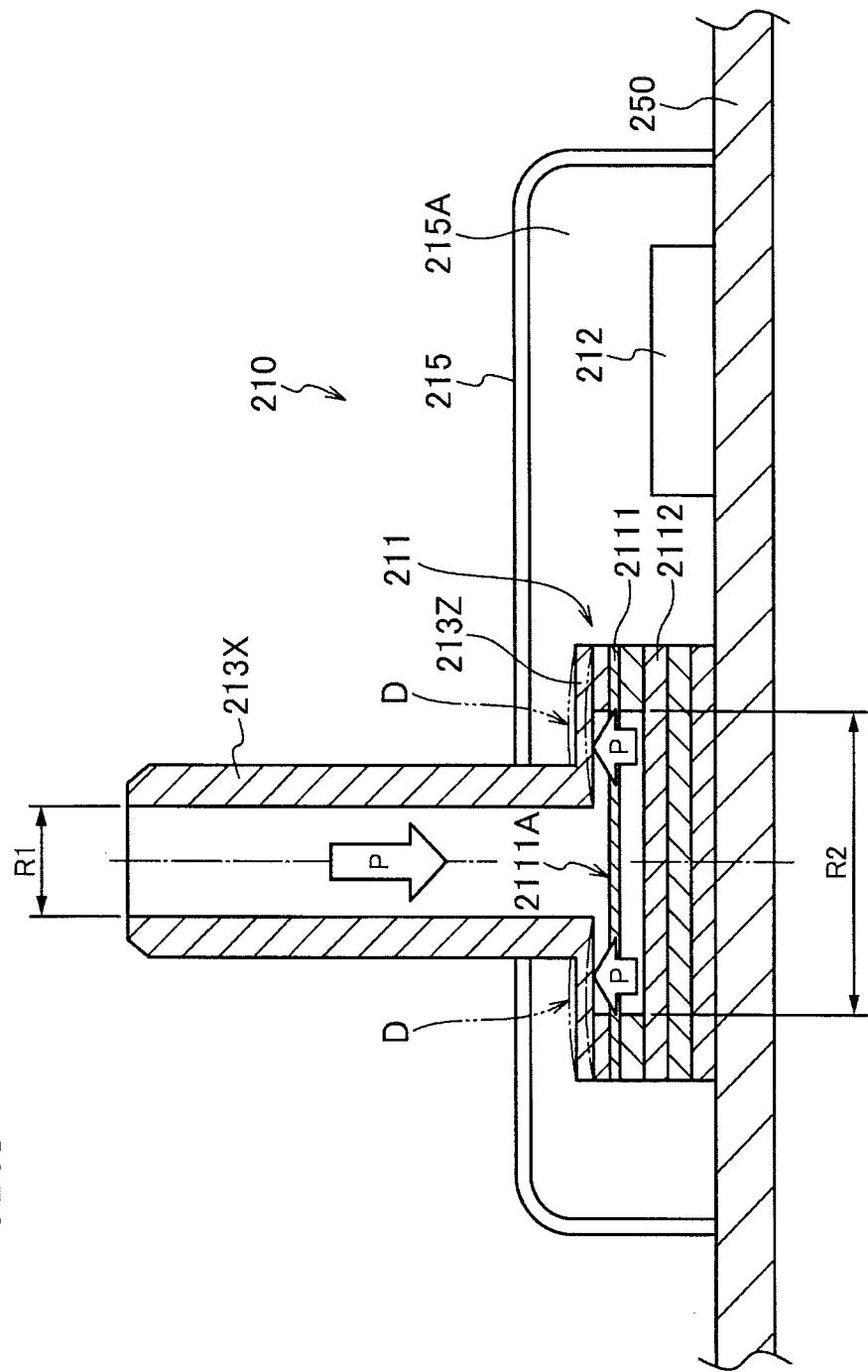
FIG. 7 is a cross-sectional view of a detection unit according to a conventional technique.

Here, FIG. 7 shows an introduction pipe 213X which has been commonly applied in a conventional technique. As shown in FIG. 7, an inner diameter R1 of the introduction pipe 213X is smaller than the diameter R2 of the pressure reception surface 2111A of the diaphragm-type element 2111. In such a case, under a condition where the inner pressure of the pneumatic tire 1 is a pressure of 1000 kPa, the pressure P is applied to the pressure reception surface 2111A of the diaphragm-type element 2111 through the introduction pipe 213X and also to a seat 213Z of the introduction pipe 213X. When such a pressure P is applied to the seat 213Z, a distortion D occurs.

Especially, the value of the distortion D tends to be large in the inner portion 215A of the shield cover 215, because the closed space is formed under an environment of the standard atmosphere (1 atm). In addition, if such a distortion D repeatedly occurs, the bonding strength between the seat 213Z of the introduction pipe 213X and the diaphragm substrates 2112 of the pressure sensor section 211 changes. Moreover, the distortion D is propagated to the diaphragm-type element 2111, and the diaphragm-type element 2111 also deforms. As a result, the precision of the pressure value detected by the detection unit 210 decreases. In other words, there has been a problem in that the precision of the pressure value tends to be decreased by the change with time.

In contrast, the inner diameter R1 of the introduction pipe 213 in this embodiment is equal to or larger than the diameter R2 of the pressure reception surface 2111A of the diaphragm-type element 2111, as shown in FIG. 5. As a result, the pressure P is applied to only the inner peripheral surface of the introduction pipe 213. Hence, a distortion D as shown in FIG. 7 does not occur in the introduction pipe 213. Accordingly, it is possible to prevent decrease in the precision of the pressure value due to the change with time.

FIG. 5 shows a case where the inner diameter R1 of the introduction pipe 213 and the diameter R2 of the pressure reception surface 2111A are equal to each other; however, the inner diameter R1 may be equal to or larger than the diameter R2.

Here, results of an evaluation in which Comparative Example and Example which were different in only the configuration of the introduction pipe 213 were prepared, and the two were compared with each other in terms of the detection precision of pressure value are described. Specifically, an introduction pipe 213X (diameter=1.3 mm) shown in FIG. 7 was prepared for Comparative Example, and an introduction pipe 213 (inner diameter R1=4.5 mm) shown in FIGS. 3 to 5 was papered for Example. In addition, under a condition of a pressure of 1000 kPa, the change of the pressure value with time in Comparative Example and the change of the pressure value with time in Example were evaluated by comparison. Note that, in this evaluation by comparison, a comparison was made in terms of the error of the pressure value in an accelerated test.

Figure 6:
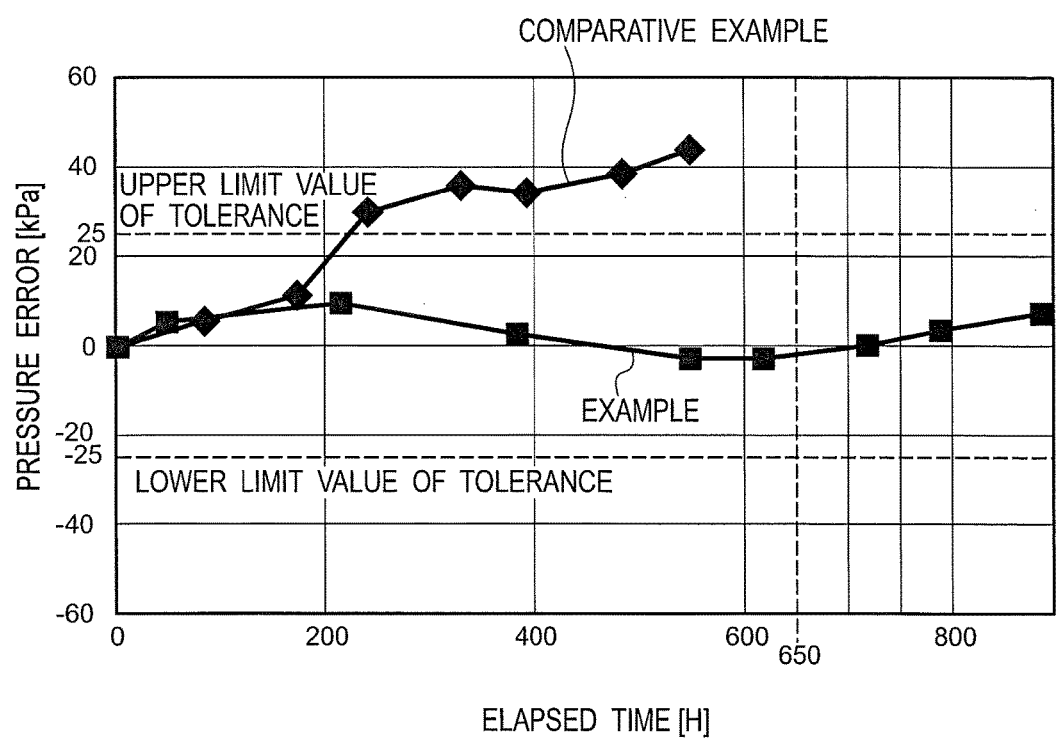
FIG. 6 is a graph showing evaluation results of Comparative Example and Example.

FIG. 6 is a graph showing the evaluation results. As shown in FIG. 6, the precision of the measured pressure value tended to decrease with the elapse of time in Comparative Example. In addition, after approximately 250 hours had passed, the error of the measured pressure value took a value out of an acceptable range (the range of ±25 kPa from the actual value) of the error in Comparative Example. Note that the acceptable range of the error is based on the inspection standards.

On the other hand, in Example, even after 650 hours (equivalent to three years of use) had passed, the error of the measured pressure value took a value within the acceptable range of the error (in the range of ±25 kPa from the actual value). Note that, in Example, even 1000 hours had passed, the error of the measured pressure value was within the acceptable range of the error. These results have demonstrated that the introduction pipe 213 according to this embodiment is capable of preventing the decrease in the precision of the pressure value due to change with time.

Note that the inner diameter R1 of the introduction pipe 213 is preferably equal to the diameter R2 of the pressure reception surface 2111A of the diaphragm-type element 2111. This configuration allows the outer circumference to be smaller than that in a case where the inner diameter R1 of the introduction pipe 213 is larger than the diameter R2 of the pressure reception surface 2111A. This makes it easier to achieve the hermeticity between the introduction pipe 213 and the shield cover 215 and the hermeticity between the introduction pipe 213 and the pressure sensor section 211.

In addition, the inner diameter R1 of the introduction pipe 213 is preferably constant in an extending direction along the central axis Ax of the introduction pipe 213. This configuration makes the introduction pipe 213 easier to manufacture and makes it possible to further reduce the cost of the products.

In this embodiment, the pressure sensor section 211 and the sensor control section 212 are separate sections in the detection unit 210. This configuration makes it possible to reduce the cost of the products in comparison with a case where the pressure sensor section 211 and the sensor control section 212 are formed integrally. For example, when one of the pressure sensor section 211 and the sensor control section 212 is found to be defective during the manufacturing, the other section can be used continuously. For this reason, it is not necessary to replace both of the pressure sensor section 211 and the sensor control section 212. According to the configuration of this embodiment, the cost of the products can be reduced in comparison with the case where the both are replaced.

In this embodiment, a front end portion 211A of the introduction pipe 213 is located in the external pipe insertion hole 312 formed in the case main body 310. In addition, the external cap 380 having one or multiple ventilation holes 343 is provided outside the external pipe insertion hole 312. This makes it possible to prevent the front end portion 211A (inlet) of the introduction pipe 213 from being directly exposed to the outside, and prevent failure of the detection unit 210.

In this embodiment, the introduction pipe 213 provided to the detection unit 210 is inserted through the external pipe insertion hole 312 formed in the case main body 310. According to this, since the introduction pipe 213 directly communicates with the inside of the pneumatic tire 1, the sealant 370 is not directly immersed in water. For this reason, it is possible to more surely achieve the prevention of the progress of the degradation of the sealant 370, the prevention of the deformation of the sealant 370, the prevention of the breakage at the bonding interface between the sealant 370 and the case.

In this embodiment, the O-ring 354 is provided at a periphery of the introduction pipe 213. In this embodiment, the case main body 310 comes into contact with the introduction pipe 213 through the O-ring 354. For this reason, it is possible to further surely prevent water of a coolant or the like from entering the case main body 310 through a space between the introduction pipe 213 and the case main body 310. Accordingly, it is possible to prevent the sealant 370 from being directly immersed in water.

In this embodiment, the O-ring 351 is provided at a periphery of the case main body 310. Since the O-ring 351 is provided between the case main body 310 and the lid member 320 in this embodiment, it is possible to further surely prevent water of a coolant or the like from entering the case main body 310 through a space between the case main body 310 and the lid member 320. Accordingly, it is possible to prevent the sealant 370 from being directly immersed in water.

In this embodiment, each ventilation hole 343 is preferably as small as possible. In this case, it is possible to prevent the entrance of water of a coolant or the like through the ventilation hole 343 as much as possible.

(6) Other Embodiments

In other embodiments, the embodiment of the present invention can be altered as follows. Specifically, the tire-state detection device 100 is described as being one attached to the pneumatic tire 1 to be mounted on a dump truck used in a mine; however, the present invention is not limited thereto. The tire-state detection device 100 may be attached to a tire to be mounted on a large vehicle (grader, shovel loader, crane, or the like) other than a dump truck.

In addition, the tire-state detection device 100 is described as being one attached to the inner liner inside the bead portion 10 in the tread width direction; however, the present invention is not limited thereto. For example, the tire-state detection device 100 may be attached to the inside of the tread portion 40, a side portion, a rim portion, or the like, and may be attached anywhere on the inner side surface 50 of the pneumatic tire 1.

In addition, the tire-state detection device 100 is described as being one attached to the pneumatic tire 1 by the detection device fixation system 500 including the seat portion 510 and the fixation portion 520; however, the present invention is not limited thereto. As a matter of course, it is only necessary that the tire-state detection device 100 can be attached to the pneumatic tire 1. In other words, the detection device fixation system 500 may have a configuration (for example, a seat portion and a fixation band) other than that described in this embodiment.

In addition, the lid member 320 is described as being one formed of a single member; however, the present invention is not limited thereto. The lid member 320 may be formed of two or more members.

Hereinabove, contents of the present invention are disclosed based on the embodiments of the present invention; however, it should not be understood that the description and drawings which constitute part of this disclosure limit the present invention. From this disclosure, various alternative embodiments, examples, and operation techniques will be easily found by those skilled in the art This application claims the priority based on Japanese Patent Application No. 2014-033678 filed on Feb. 25, 2014, which is incorporated herein by reference in its entirety.

INDUSTRIAL APPLICABILITY

According to features of the present invention, it is possible to provide a tire-state detection device capable of surely detecting an inner pressure of a tire by preventing failure, while reducing the cost of the products.

REFERENCE SIGNS LIST 1 pneumatic tire
10 bead portion
20 carcass layer
30 belt layer
40 tread portion
50 inner side surface
100 tire-state detection device
200 electronic component
210 detection unit
211 pressure sensor section
211A front end portion
212 sensor control section
213 introduction pipe
213A front end portion
213X introduction pipe
213Z seat
215 shield cover
216 pipe insertion hole
220 antenna 230 battery
240 electronic circuit portion
250 circuit board
300 case
310 case main body
310A open surface
312 external pipe insertion hole
315 locking raised portion
320 lid member
321 bolt
330 fixation hook
341 locking recessed portion
343 ventilation hole
351, 354 O-ring
370 sealant
380 external cap
500 detection device fixation system
510 seat portion
520 fixation portion
530 bolt
2111 diaphragm-type element
2111A pressure reception surface
2112a to 2112e diaphragm substrates
Ax central axis
R1 inner diameter
R2 diameter

The invention claimed is:

1. A tire-state detection device comprising:
an electronic component including a detection unit that detects a pressure of a tire; and
a case that houses the electronic component, wherein the case includes
    a box member that houses the electronic component and that has an open surface formed thereon, and
    a lid member that covers the open surface,
    the detection unit includes
      a pressure sensor section having a diaphragm-type element,
      a sensor control section that controls the pressure sensor section, and
      a dome-shaped cover member that covers the pressure sensor section and the sensor control section,
an inside of the box member having the open surface covered with the lid member is filled with a sealant, and
the diaphragm-type element is made of a ceramic,
the detection unit includes an introduction pipe that connects a pressure reception surface of the diaphragm-type element to an outside of the case,
a pipe insertion hole through which the introduction pipe is inserted is formed in the cover member,
the introduction pipe is formed in a cylindrical shape,
the pressure reception surface of the diaphragm-type element is formed in a circular shape, and
an inner diameter of the introduction pipe is equal to or larger than a diameter of the pressure reception surface of the diaphragm-type element.

2. The tire-state detection device according to claim 1, wherein
the inner diameter of the introduction pipe is equal to the diameter of the pressure reception surface of the diaphragm-type element.

3. The tire-state detection device according to claim 1, wherein
an external pipe insertion hole through which the introduction pipe is inserted is formed in the box member,
a front end portion of the introduction pipe is located inside the external pipe insertion hole,
an external cap that covers the external pipe insertion hole is provided outside the external pipe insertion hole, and
one or a plurality of ventilation holes are formed in the external cap.

4. The tire-state detection device according to claim 1, wherein
the pressure sensor section and the sensor control section in the detection unit are separate sections.

* * * * *